United States Patent Office 3,533,810
Patented Oct. 13, 1970

---

3,533,810
COMPOSITIONS AND METHODS FOR COATING FRUITS AND VEGETABLES
Warren L. Shillington, Twin Falls, Idaho, and James J. Liggett, Libertyville, Ill. (both % Chemical Supply Co., P.O. Box 564, Twin Falls, Idaho 83301)
No Drawing. Filed Nov. 9, 1967, Ser. No. 681,912
Int. Cl. C09d 5/14; A23b 7/16
U.S. Cl. 106—15                                    10 Claims

ABSTRACT OF THE DISCLOSURE

An aqueous liquid composition for use in coating fruits and vegetables to combat microorganisms, minimize oxidative deterioration, and for generally improving the overall appearance of the product, and which is particularly effective in preventing or retarding greening in white potatoes. The composition comprises lecithin, methyl anthranilate, an edible acid or salt thereof, and at least one chemical agent effective to combat growth of microorganisms. The aqueous composition is applied directly to the raw article of produce by brushing, spraying, etc., at normal ambient temperatures.

---

This invention relates to the treatment of fruits and vegetables and, more particularly, to compositions and methods for coating fruits and vegetables to reduce deterioration and improve saleability. Though applicable to fruits and vegetables broadly, the invention is especially useful in the treatment of potatoes and is effective to inhibit greening of the potatoes.

Fruits and vegetables, once harvested, are subject to progressive deteriorations which result from the action of bacteria, fungi and other microorganisms. Such deteriorations greatly impair the flavor, aroma and appearance of the product and are responsible for substantial economic losses. In the case of white potatoes, an additional problem arises because of the tendency of the potato to undergo a more or less gradual change in color, this change being commonly referred to as "greening," caused by the development of chlorophyll in the cells of the potato. Greening results in an undesirable green color, spotted appearance, and a generally inferior overall appearance, and is frequently accompanied by a deterioration of the oragnoleptic characteristics of the potato.

Thus, vegetable and fruit growers, shippers, processors, etc. are constantly faced with the problem of transporting their products to the ultimate consumer with a minimum loss due to deterioration. Various compositions and methods have been proposed for preventing deterioration and improving the general appearance of harvested vegetables and fruits. One such method involves transporting the fruit in a controlled atmosphere of an inert gas, e.g., nitrogen. Another method involves shipment and storage of the fruit or vegetable in a plastic container or envelope designed to prevent exposure to air. The use of specially colored fluorescent light (e.g., green and gold) for display purposes, and which has been found to cause less greening, has also been proposed. It has also been proposed by prior-art workers to treat freshly harvested vegetables and fruits with compositions comprising chemical agents which are effective to combat microorganisms as well as to improve the general appearance of the produce. Though many such proposals have been adopted and have achieved commercial acceptance, none has proved entirely satisfactory. Thus, the use of controlled special atmospheres is unduly expensive and cumbersome. Use of enveloping packages has only a relatively limited preserving effect and is not applicable to products shipped in bulk. The use of colored fluorescent light is expensive, only effective to a limited extent, requires frequent rotation of the products on display, offers poor light for display purposes, etc. Compositions designed to combat microorganisms have in general been of only limited effectiveness, particularly in the sense that each composition has operated to control only certain types of deterioration. No single composition or method has heretofore been available which has been satisfactory for treating vegetables and fruits generally, and for not only retarding deterioration and discoloration but also improving the overall appearance and organoleptic quality of the product. And no composition or method of such broad applicability has heretofore been effective to inhibit greening of white potatoes.

It is accordingly a general object of this invention to provide an improved composition and method for treating and preserving fresh fruits and vegetable.

Another and more particular object is to provide a composition and method for preventing or retarding greening of white potatoes.

Yet another object is to provide a multifunctional method and composition for treating fruits and vegetables to combat microorganisms, minimize oxidative deterioration, inhibit the adverse effects of light, and reduce moisture loss due to respiration and evaporation.

Still another object is to provide a composition for treating fruits and vegetables which preserves and otherwise protects the food products while concurrently enhancing the visual appearance and armoa of the created product.

Another object is to provide a protective coating composition for fresh fruits and vegetables which unexpectedly greatly reduces moisture loss by evaporation and respiration.

A further object is to provide a food preservative which controls unfavorable odors and, additionally and unexpectedly, enhances the odor of the treated product, and retards sprouting in white potatoes.

The manner in which the foregoing and other objects are achieved in accordance with the invention will be evident from the following detailed description, wherein particularly advantageous composition and method embodiments are disclosed for illustrative purposes.

Stated broadly, the objects of the invention are attained by coating the raw fruit or vegetable with an aqueous liquid composition comprising lecithin, methyl anthranilate, or equivalents thereof an edible acid or acid salts thereof, and at least one chemical agent effective to inhibit growth of microorganisms, including bacteria, molds, and fungi, which tend to cause deterioration of the fruit or vegetable.

In practicing the invention, the aqueous composition is applied directly to the raw article of produce at normal ambient temperatures without preparatory treatment. The article can simply be dipped into the liquid treating composition, or the liquid composition can be sprayed or brushed uniformly onto the entire surface of the article, using conventional spraying or brushing techniques and equipment. The article is then dried, either artificially or naturally, with the formation of a thin, continuous, uniform coating of the non-aqueous components of the composition on the surface of the article.

The aqueous liquid compositions of the invention are stable and uniform, with the lecithin and methyl anthranilate dispersed in the aqeos medium and the edible acid, or salt thereof, dissolved therein. The lecithin not only provides an emulsion such that the product is stable, in the sense of remaining uniform for normal periods of shelf life, but also forms a continuous film on the treated article of produce, which film carries the other active ingredients, lends an appealing "finish" to the treated article, and acts as an optical filter to screen out light and so prevent chlorophyll formation. The methyl anthranilate also functions as an optical filter or light barrier, the combined light barrier effect of the lecithin and methyl anthranilate being adequate to substantially eliminate all deleterious effects normally resulting from exposure of the article of produce to light. The methyl anthranilate also provides an aromatic freshness which makes the treated article of produce more appealing. The natural anti-oxidant properties of the lecithin are enhanced by the presence of the edible acid or acid salts, the latter acting as a chemical barrier against oxygen. The edible acid such as phosphoric acid, citric acid, etc., or their acid salts, e.g., sodium acid pyrophosphate, serves to adjust or control the pH and also serves to precipitate magnesium, manganese and iron, so rendering these metals unavailable for their normal role in chlorophyll formation. Because of costs, commercial availability, etc., phosphoric acid is particularly advantageous for use in the composition of the present invention.

The agents included in the liquid composition for combatting microorganisms are selected from a number of such agents generally recognized in the art as effective for that purpose, including, for example, sodium sulfite, sodium bisulfite, sodium propionate, sodium benzoate, methyl p-hydroxy benzoate, etc. Of the above, the organic carboxylic acids have been found to be particularly advantageous when used in the composition of the present invention. Generally this class includes the saturated and unsaturated organic-free carboxylic acids, their alkali esters, i.e., methyl, ethyl, etc., and their edible metal salts, i.e., the sodium, potassium, magnesium and calcium salts.

Additionally, while a single preserving agent may be incorporated into the composition of the present invention, it has been found to be particularly advantageous to combine in selected proportions a combination of the preserving agents. Particularly advantageous examples of the latter include the combination of from .01–0.2% by weight methyl p-hydroxy benzoate and from .01–0.1% by weight propyl p-hydroxy benzoate. A second particularly advantageous example includes from .025–0.1% by weight sodium benzoate in combination with from .025–0.1% methyl p-hydroxy benzoate.

We have found that the effectiveness of the aqueous liquid treating compositions can be increased by employing certain additional ingredients. It is advantageous to employ a wetting agent, and particularly dioctyl sodium succinate, to increase penetration of the aqueous composition into the surface of the article of produce being treated. In a particularly advantageous embodiment, an emulsifying agent such as propylene glycol may be used. An edible alcohol, i.e., ethyl alcohol may also be employed to increase the solubility of methyl and propyl p-hydroxy benzoate, if the latter are employed. To keep any metal ions which are present in a state of solution, so as to aid in emulsification of the lecithin, it is helpful to employ a sequestering agent, such as calcium disodium ethylene diamine tetraacetic acid salt.

In formulating the aqueous composition, lecithin can be employed in an amount in the range of 1.0–15.0% by weight of the total composition. It has been found to be advantageous to heat the lecithin to destroy or inactivate any naturally occurring enzymes present therein. In this regard, temperatures on the order of 185–195° F. have been found to be suitable for inactivating any enzymes without damage to the lecithin. The lecithin may be heated at any stage during the formulation of the aqueous composition. The methyl anthranilate is used in an amount equal to 0.05–0.10% by weight. The amount of edible acid, or salt thereof, employed is in the range of 0.5–3.0% by weight. The amount of the agent or agents employed to combat microorganisms is in the range of 0.01–2.0% by weight. When dioctyl sodium succinate or other wetting agent is employed, the proportion thereof is maintained at 0.025–0.1% by weight. When a sequestering agent, such as calcium disodium ethylene diamine tetraacetic acid salt is used, the proportion thereof is 0.5–3.0% by weight, when an emulsifying agent, such as propylene-glycol, is used, the proportion thereof is 4.0–15.0% by weight. If an alcohol is employed to enhance the solubility of the methyl and propyl p-hydroxy benzoates, the proportion thereof is 0.1 to 2% by weight.

EXAMPLE 1

3 g. methyl p-hydroxy benzoate was initially thoroughly mixed in three quarts of water. To this mixture was added 1 cc. of methyl anthranilate. Next, 8 oz. of a mixture containing 85% by weight lecithin and 15% by weight of a nonionic surface active agent which is a polyoxyalkylene derivative of sorbitan monooleate marketed under the trademark Tween 80 by Atlas Powder Co., Wilmington, Del., was slowly and continuously added to the above aqueous composition while vigorously stirring the solution with a conventional Waring type blender. The stirring was continued until the liquid composition was smooth and free of lumps. The composition was next heated to 190° F. and maintained at this temperature for approximately 30 minutes. Next, 60 cc. of 50% phosphoric acid was slowly added to the composition and the composition was thoroughly mixed for approximately 2 minutes.

EXAMPLE 2

The procedure of Example 1 was repeated except that 2 g. of propyl p-hydroxy benzoate was initially added in addition to the 3 g. methyl p-hydroxy benzoate.

EXAMPLE 3

The procedure of Example 2 was repeated except that 4 g. each of sodium benzoate and methyl p-hydroxy benzoate were substituted in lieu of the methyl and propyl p-hydroxy benzoate (3 and 2 g., respectively). Commercially available pure lecithin was also substituted for the lecithin Tween 80 mixture.

EXAMPLE 4

The procedure of Example 3 was repeated except that, in addition thereto, 4 g. dioctyl sodium sulfosuccinate, 8 oz. of propylene glycol, and 100 g. calcium disodium ethylenediamine tetraacetic acid were initially added, along with the compounds set forth in Example 3, to the three quarts of water. The resulting aqueous composition was passed through a homogenizer to reduce the particle sizes and aid in establishing a stable emulsion.

EXAMPLE 5

The procedure of Example 4 was repeated except that 90 g. of sodium acid pyrophosphate was substituted in lieu of the phosphoric acid, and 6 oz. of propylene glycol and 2 oz. of ethyl alcohol were substituted for the 8 oz. of propylene glycol.

The following examples illustrate the method embodiments of the invention employing the unique aqueous liquid compositions of Examples 1–5.

EXAMPLE 6

After washing, raw unpeeled white potatoes were immersed in a solution prepared in accordance with Example 1. The potatoes were immersed in the solution at room temperature and, after several seconds, were removed. The excess solution was removed by shaking and the potatoes were thereafter dried in a counter-current forced hot air drier.

EXAMPLE 7

The procedure set forth in Example 6 was repeated except that the solution of Example 4 was sprayed in a fine mist onto the individual potatoes.

EXAMPLE 8

The procedures set forth in Examples 6 and 7 were followed with other fresh fruits and vegetables, including red apples, pears, sweet potatoes, lemons, carrots, beets, tomatoes, egg plants, turnips and grapefruit.

The following tables strikingly illustrates comparison of untreated food products products treated with conventional aqueous compositions containing conventional known agents effective for combatting growth of microorganisms and food products treated with the unique aqueous liquid composition of the present invention.

TABLE OF COMPARISON FOR CHEMICAL TREATMENTS OF WHITE POTATOES

The following varieties of potatoes, Kennebec, Russett Burbank, Norland, Norgold, Russett, Katahdin, were treated with the formulation of the invention designated as X–5; standard potato wax; 200 parts per million of chlorine solution; the fungicide, Capitan; and no treatment. Wax chlorine and Capitan are post harvest chemical treatments used by the potato and vegetable packing industry. The various materials were sprayed to run off.

TABLE I—POTATOES

| Treatment | Control of greening | Improved finish | Control of rot and mold | Control of moisture loss | [1] Control of thumb-nail check | Improved aroma | Time after treatment |
|---|---|---|---|---|---|---|---|
| X–5 | Yes | Yes | Yes | Yes | Yes | Yes | 14 days. |
| Wax | No | Yes | No | Yes | Yes | No | Do. |
| 200 p.p.m. chlorine | No | No | Yes | No | No | No | Do. |
| Capitan | No | No | Yes | No | No | No | Do. |
| NO treatment | No | No | Yes | No | No | No | Do. |

[1] Thumbnail check is a small indentation on the skin of the potato and is normally caused by loss of moisture and temperature variations.

REMARKS: The development of chlorophyll seems to contribute a degree of control of rot and mold, however when kept in a dark container, such as a box, rot and mold developed in the untreated potatoes.

TABLE OF COMPARISON SHOWING RESULTS ON RED AND YELLOW APPLES, CITRUS FRUITS INCLUDING ORANGES, GRAPEFRUITS AND LEMONS

Treatment was made by spraying the material to run off on the above mentioned fruits. These items are not subject to development of chlorophyll as found in the potatoes therefore greening observations are not listed.

TABLE II.—COMPARISON CHART—APPLES, ORANGES, ETC.

| Treatment | Improved finish | Control of moisture loss | Control of mold and bacteria | Improved aroma | Time after treatment |
|---|---|---|---|---|---|
| X–5 | Yes | Yes | Yes | Yes | 10 days. |
| Wax | Yes | Yes | No | No | Do. |
| Chlorine, 200 p.p.m. | No | No | Yes | No | Do. |
| Capitan | No | No | Yes | No | Do. |
| No treatment | No | No | No | No | Do. |

REMARKS: Carrots, red beets, turnips, and squash showed no visible improvement in finish because of the rough surface. The aroma was enhanced and reduced moisture loss was apparent in the treated tests as compared to the untreated items. Other chemical formulations were not compared as chemical treatments are not presently being used on these vegetables.

Cucumbers are commonly treated with mineral oil in order to improve their appearance. This treatment was compared with formula X–5. The cucumbers treated with formula X–5 have much better appearance then the ones treated with mineral oil as the surface was not oily and greasy.

Avocados, egg plant, pears, and onions showed no visible improvement in finish as they are already glossy in their natural state. A slight reduction in moisture loss was noted. Treated tomatoes had visibly less rot and wrinkling of the skin when treated with formula X–5 than those which were untreated.

While particularly advantageous embodiments of the invention have been described and illustrated by the examples, it will be recognized by those skilled in the art that various changes and modifications can be made therein without departing from the scope of the invention as defined by the appended claims.

What is claimed is:

1. In an aqueous liquid composition which is for use in coating vegetables and fruits and of the type comprising lecithin, an edible acid or salt thereof, and an anti-microbial agent effective for combating growth of microorganisms, the improvement comprising maintaining in said composition; methyl anthranilate in an amount sufficient to co-act with the lecithin and edible acid or salt thereof, such that said lecithin and methyl anthranilate combine to afford light barrier characteristics so that the coating reduces oxidative deterioration which would normally be stimulated by exposure of the product to light, whereby said composition, when applied to fruits and vegetables and then dried, providing a thin continuous coating which enhances the visual appearance of the treated product, reduces spoilage, and, in the case of potatoes, inhibits greening.

2. The composition in accordance with claim 1 wherein said composition comprises 1.0–15% by weight lecithin; 0.05–.01% by weight methyl anthranilate; 0.5–3% by weight of a compound selected from the group consisting of edible acids and edible acid salts; and 0.025–2.0% by weight of at least one edible anti-microbial agent effective for combating growth of microorganisms, said composition further comprising 0.025–1% by weight of a wetting agent and 4.0–15% by weight of an emulsifying agent.

3. The composition in accordance with claim 2 wherein the edible anti-microbial agent is select from the group consisting of sodium benzoate, methyl p-hydroxy benzoate and propyl p-hydroxy benzoate and mixtures thereof.

4. The composition in accordance with claim 2 wherein said wetting agent is dioctyl sodium succinate and said emulsifying agent is propylene glycol.

5. The composition in accordance with claim 2, said composition further comprising 0.5–3.0% by weight of the calcium disodium salt of ethylene-diamine tetraacetic acid.

6. A method for treating raw unpeeled potatoes to inhibit greening due to chlorophyll development and to otherwise preserve the potatoes and enhance the overall appearance thereof comprising the steps of coating the untreated raw potatoes with an aqueous liquid composition comprising lecithin, an edible acid and at least one edible agent effective for combating the growth of microorganisms, and drying the treated product to form a thin continuous coating thereon, the improvement comprising maintaining in said composition methyl anthranilate in an amount sufficient to co-act with the lecithin such that said lecithin and methyl anthranilate combine to afford light barrier characteristics so that the coating reduces oxidative deterioration which would normally be stimulated by the exposure of the product to light and at the same time serves to screen out the light to inhibit the formation of chlorophyll.

7. A method according to claim 6 wherein said edible anti-microbial agent is selected from the group consisting of sodium benzoate, methyl p-hydroxy benzoate and propyl p-hydroxy benzoate and mixtures thereof.

8. A method according to claim 6, wherein said aqueous liquid composition further comprises a wetting agent and an emulsifying agent.

9. A method according to claim 8, wherein said wetting agent is dioctyl sodium succinate and said emulsifying agent is propylene glycol.

10. A method according to claim 6, wherein said aqueous liquid composition further comprises a calcium disodium salt of ethylene-diamine tetraacetic acid.

References Cited

UNITED STATES PATENTS 2,690,396  9/1954  Chenicek _____ 99—154 XR
2,744,019  5/1956  Snyder et al. _____ 99—168 XR
2,909,435  10/1959  Watters et al. _____ 99—168

OTHER REFERENCES

Rose, A. et al., The Condensed Chemical Dictionary, 6th ed., 1961, p. 731 relied on.

JULIUS FROME, Primary Examiner

L. B. HAYES, Assistant Examiner

U.S. Cl. X.R.

99—154, 156, 168